United States Patent [19]

Norris

[11] Patent Number: 4,930,156
[45] Date of Patent: May 29, 1990

[54] TELEPHONE RECEIVER TRANSMITTER DEVICE

[75] Inventor: Elwood G. Norris, Poway, Calif.

[73] Assignee: Norcom Electronics Corporation, Poway, Calif.

[21] Appl. No.: 273,216

[22] Filed: Nov. 18, 1988

[51] Int. Cl.$^5$ ............................................. H04R 1/06
[52] U.S. Cl. .................................. 379/388; 379/420; 379/430; 439/166; 439/174
[58] Field of Search ....................... 379/388, 420, 430; 439/166, 174, 628

[56] References Cited

U.S. PATENT DOCUMENTS

| | | | |
|---|---|---|---|
| 1,557,686 | 10/1925 | Hagerup | 379/430 |
| 3,317,880 | 5/1967 | Meyer | 439/174 |
| 4,588,867 | 5/1986 | Konomi | 379/430 |

*Primary Examiner*—Stafford D. Schreyer
*Attorney, Agent, or Firm*—Thorpe, North & Western

[57] ABSTRACT

A telephone speaker/microphone device for suspending in a user's ear to enable hands-free communication without common occurrence of feedback. The device utilizes control circuitry capable of interconnecting microphone and speaker leads from a telephone or other communicating device to a speaker element and microphone element which are embodied in a single earpiece and suspended at the user's ear. The speaker element and microphone element are positioned sufficiently close and are wired such that the speaker signal is approximately 180 degrees out of phase with the microphone signal and results in cancellation of feedback by virtue of the out of phase relationship. This device and method are particularly useful in communication devices which utilize a side tone electronically transmitted from the microphone into the speaker element at the user's ear. Such side tone signal can be utilized in an out-of-phase relationship to cancel ambient feed back which has historically prevented close proximate use of microphone and speaker elements.

19 Claims, 4 Drawing Sheets

TELEPHONE RECEIVER TRANSMITTER DEVICE

BACKGROUND OF THE INVENTION

1. Field of Invention

This invention relates to microphone and speaker devices associated with a telephone for allowing a user to listen and speak in duplex mode. More particularly, the present invention relates to a speaker and microphone combination which can be positioned at the ear of the user to enable hands-free communication over the telephone.

2. Prior Art:

The conventional telephone device utilizes a handset which includes both the microphone and speaker positioned at opposing ends in a spacial relationship which locates the speaker at the ear of the user and the microphone near the mouth of the user. The speaker portion of the telephone handset includes a cupped section which isolates the speaker sound and shields it from transmission beyond the ear when positioned against the user's head. Accordingly, the microphone portion of the handset does not detect transmitted sounds from the speaker because of its separated position from the speaker at a distance of three to ten inches, as well as a shielding effect from the cupped configuration for the speaker casement.

This acoustic isolation between the microphone and ear speaker are critical for several reasons, including the avoidance of feedback. Acoustical feedback occurs when the acoustical vibrations received at the microphone include both sound generated by the voice of the user, as well as ambient sound vibrations which include the same voice or vibrations transmitted through the speaker. Amplication of the voice signal and transmitted sound signal are amplified repeatedly and generate the accustomed squeal which characterizes the occurrence of feedback. The most common occurrence of feedback is when an individual holds the microphone near a speaker which is broadcasting the very sounds which the microphone detects. It is well known that an individual speaking through a microphone must separate himself from any of the speakers broadcasting the amplified sound.

The conventional telephone device creates an even greater risk of feedback because of an included side tone which enables the user to hear his own voice through the ear speaker the same as the remote party hears his voice through a telephone line. Specifically, this side tone is split off from the actual electronic transmission of the speaker's voice through the telephone device. This split off signal is routed to the ear speaker for transmission to the user. In actuality, therefore, the user hears the full conversation through the ear speaker, including both the remote signal generated by the other telephone user and the original signal transmitted from the first user's telephone.

Because of this side tone, placement of the ear speaker in proximity to the microphone component potentially generates feedback signal in the same way that the microphone of a PA system held near its output speaker will result in feedback squeal. For this reason, headsets applied to telephone devices have utilized a boom to displace the microphone to the vicinity of the mouth and away from the speaker element of the headset. In addition, sound insulating foam or other materials is cupped around the ear microphone component to prevent transmission of sound, including the side tone, from being picked up from the microphone. Practically speaking, this separation distance must be at least two centimeters, and is generally preferred to be at least five centimeters. This is the case with conventional handsets, as well as all headset-type telephones.

In the case of headset-type devices, the inconvenience of having the microphone boom projecting in front of the user's face is difficult to overexaggerate. Those who have required use of a hands-free telephone system are well experienced with the disadvantages. For example, various objects brought near the face may catch on or strike the boom, tearing it from the headset or otherwise creating sudden striking sounds in the ear of the remote listener. The terminal end of the boom tends to catch on clothing and various other obstacles at the most inappropriate times. Aesthetically it detracts from the user's appearance, and therefore has prompted development of creative means of concealment when used with television and other media applications.

Nevertheless, in absence of an acceptable alternative, the headset with projecting boom remains the dominant device for hands-free telephone communication or electric voice transmission in general.

In fact, the broadcast industry in general utilizes the same side tone technology as is used in the telephone system to permit the user to hear his or her own voice in a manner similar to that which the audience hears through a PA system. Accordingly, the same technical limitations arising from feedback apply in the broadcast industry, as they do to telephone communications.

What is needed is a device which eliminates the need for the user of a microphone boom and somehow permits location of all microphone and speaker elements within an earpiece capable of being positioned or suspended at the ear of the user.

OBJECTS AND SUMMARY OF THE INVENTION

It is an object of the present invention to provide a technique for eliminating feedback within a microphone/speaker loop.

It is a further object of the present invention to provide an earpiece which can be positioned at the user's ear and which functions as both a microphone and speaker in duplex mode utilizing separate microphone and speaker components.

It is another object of the present invention to provide a speaker and microphone combination which forms part of a telephone device and enables hands-free communication over the telephone.

It is a further object of the present invention to provide a microphone/speaker combination capable of being attached to any telephone as a substitute for the conventional handset.

A still further object of the present invention is development of a device and method for adapting telephones of differing wiring configuration for universal attachment to speaker/microphone leads.

These and other objects are realized in a speaker/microphone device capable of being positioned at the ear and having a separate speaker element and separate microphone element positioned within a separation distance of approximately less than 1.5 centimeters and wherein the phase relationship of respective microphone and speaker signals are approximately inverted at 180 degrees out of phase. When used as part of a telephone device, the speaker element is electrically coupled such that signals received at the speaker element are approximately 180 degrees out of phase with the side tone generated by the telephone device. As a consequence, ambient signals received by the microphone are substantially cancelled by the inverted signal, virtually eliminating feedback problems despite the proximate positioning of the microphone and speaker elements.

Other objects and features of the present invention will be apparent to those skilled in the art, taken in view of the following detailed description in combination with the accompanying drawings.

DETAILED DESCRIPTION OF THE INVENTION

Figure 1:
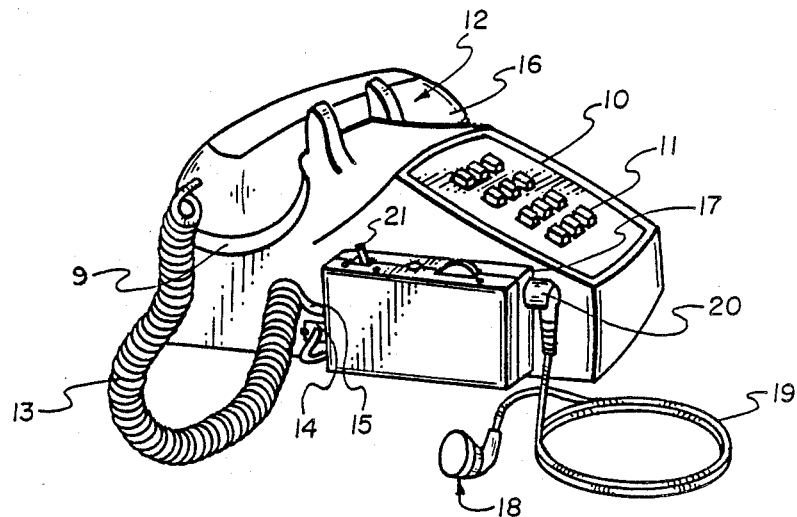
FIG. 1 shows a perspective view of a telephone device with an attached control circuitry and microphone/speaker combination capable of being positioned at the ear.

Referring now to the drawings:

FIG. 1 shows a conventional telephone 10 having a push button key pad 11, conventional handset 12 and coupling cord or pig tail 13 which attaches the handset 12 to electronic circuitry contained within the telephone 10. Typically, a jack receptacle 14 is provided which enables removable attachment of one end 15 of the pigtail to the telephone jack 14. The referenced handset 12 includes the well known elements of a microphone component 9 and speaker component 16 which are adapted for positioning at the mouth and ear respectively.

Figure 2:
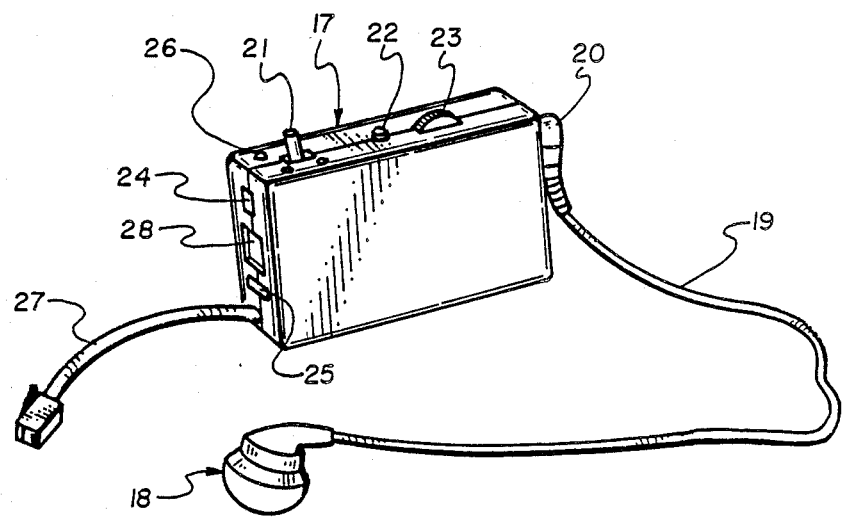
FIG. 2 provides a perspective view of the control circuitry and casement with attached earpiece and telephone hook up components.

The phone embodiment 10 is disclosed in FIG. 1 with an attached casement 17 which is shown in greater detail in FIG. 2. Encasement provides enclosure for control circuitry for switching between use of the handset 12 and an earpiece 18 containing microphone and speaker elements which function in a similar manner to the microphone 9 and speaker 16 of the handset 12. This earpiece 18 is coupled to the control circuitry and casement 17 via connecting wires 19 which couple at each end to the earpiece 18 and attachment jack 20. A switch 21 is provided to permit the user to select either the handset 12 or earpiece 18 for operation. Additional control elements include a mute button 22, volume control 23, battery switch 24, compatibility interconnect jack 25 and outgoing volume control 26.

The device is wired into the telephone circuit utilizing an input lead 27 which attaches into the jack 14 leading into the telephone device and a female jack 28 which receives the modular plug 15 of the handset 12. In this configuration, the subject invention is wired in series with the handset and enables the user to switch between handset or hands-free operation. These respective components will be discussed in greater detail hereafter. It should also be apparent to those skilled in the art that the illustrated embodiment which discloses an external attachment to a conventional telephone is equivalent to disclosure of an internal, pre-wired embodiment of the same invention.

Figure 3:
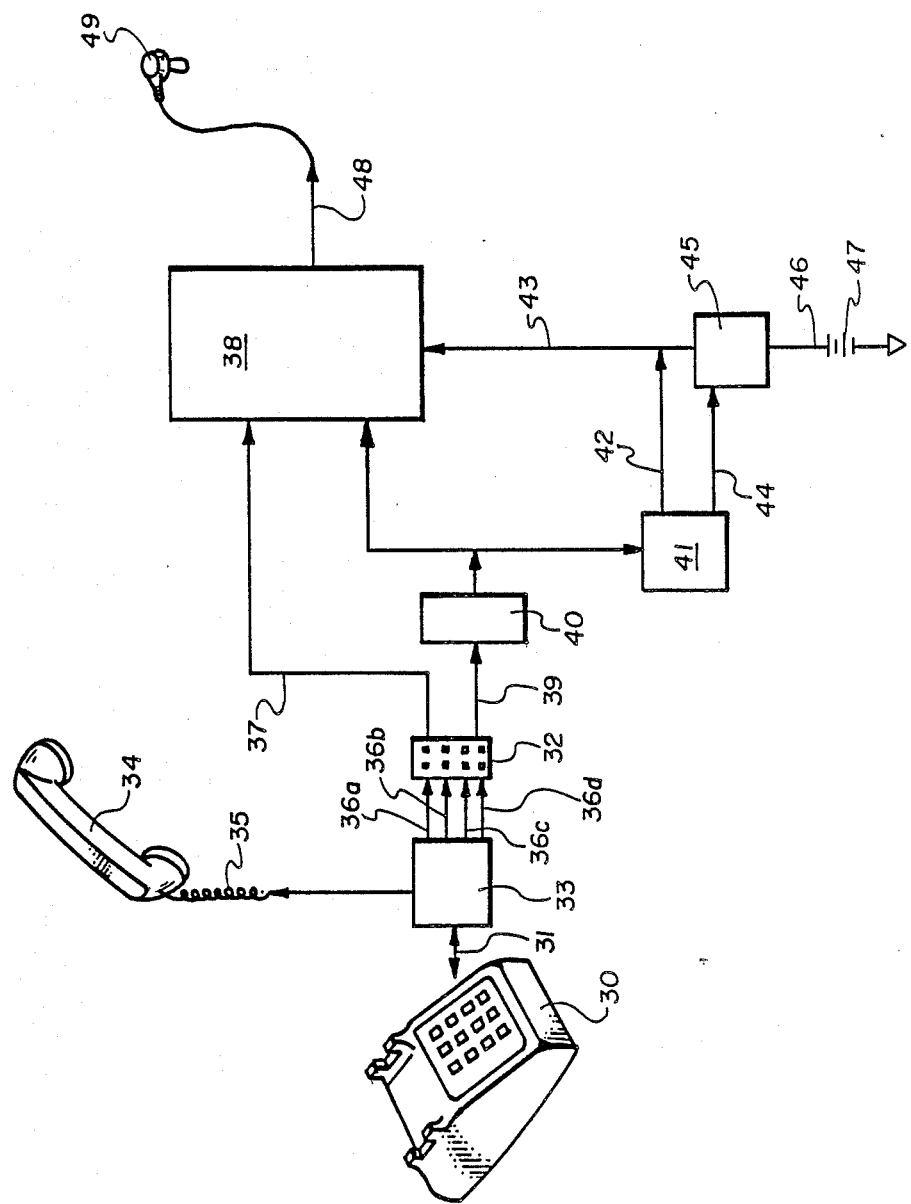
FIG. 3 represents a block diagram of the present invention, adapting a conventional telephone for use with either a handset or ear speaker/mike combination device.

FIG. 3 illustrates a block diagram representing the various functions performed by the control circuitry and attached components.

In FIG. 3 a basic telephone unit and casement 30 are illustrated and coupled into the telephone at a standard jack (item 14 in FIG. 1). Microphone and speaker signal 31 are communicated to and from the telephone via standard, four-lead telephone wire represented by item 27 of FIG. 2. Two of these leads represent speaker signal and two represent microphone signal. Inasmuch as not all telephone systems have standard wiring, the present invention embodies an interconnect device 32 which enables modular adjustment of the various wiring configurations by mere replacement of pre-wired plug inserts. This aspect of the present invention will be discussed hereafter.

Control of actual telephone signals 31 is initially provided by a mode switching device 33. This is accomplished by a toggle switch wherein one position transfers the signal directly to the hand set 34 as if the control circuitry and earpiece of the present invention were not attached. This handset is coupled via its connector line or pigtail 35 into the mode switch 33, which is contained within the casement 17 shown in FIG. 2.

When switched to a secondary position, signal 31 is transferred into interconnect jack 32. As indicated previously, phone leads 36a, 36b, 36c and 36d represent the microphone and speaker signals generated or received by the telephone 30. These signals are properly oriented at the interconnect jack 32. One output line 37 carries speaker signal and feeds to the primary control circuitry 38 which includes speaker amplifier, mike preamplifier and phasing control. The second output line 39 carries microphone signal through a diode bridge 40 and into a mike selector switch 41 which operates to select circuitry for a carbon mike or electret mike, the dominant microphone components used in telephone systems. Selection of carbon mike circuitry shunts the mike signal through line 42 and line 43 and directly into the control circuitry 38. If electret mode is selected, microphone signal is sent along line 44 into a power supply logic circuit 45 which simulates appearance of a carbon microphone, despite the presence of the electret microphone system. This power supply logic circuit is coupled via line 46 to battery 47. The logic circuit 45 functions to generate the appropriate mike signal for transmission along line 43 to the control circuitry 38. Both microphone and speaker signals are transmitted along a four wire connection 48 to an ear mounted speaker/microphone combination 49.

Figure 4:
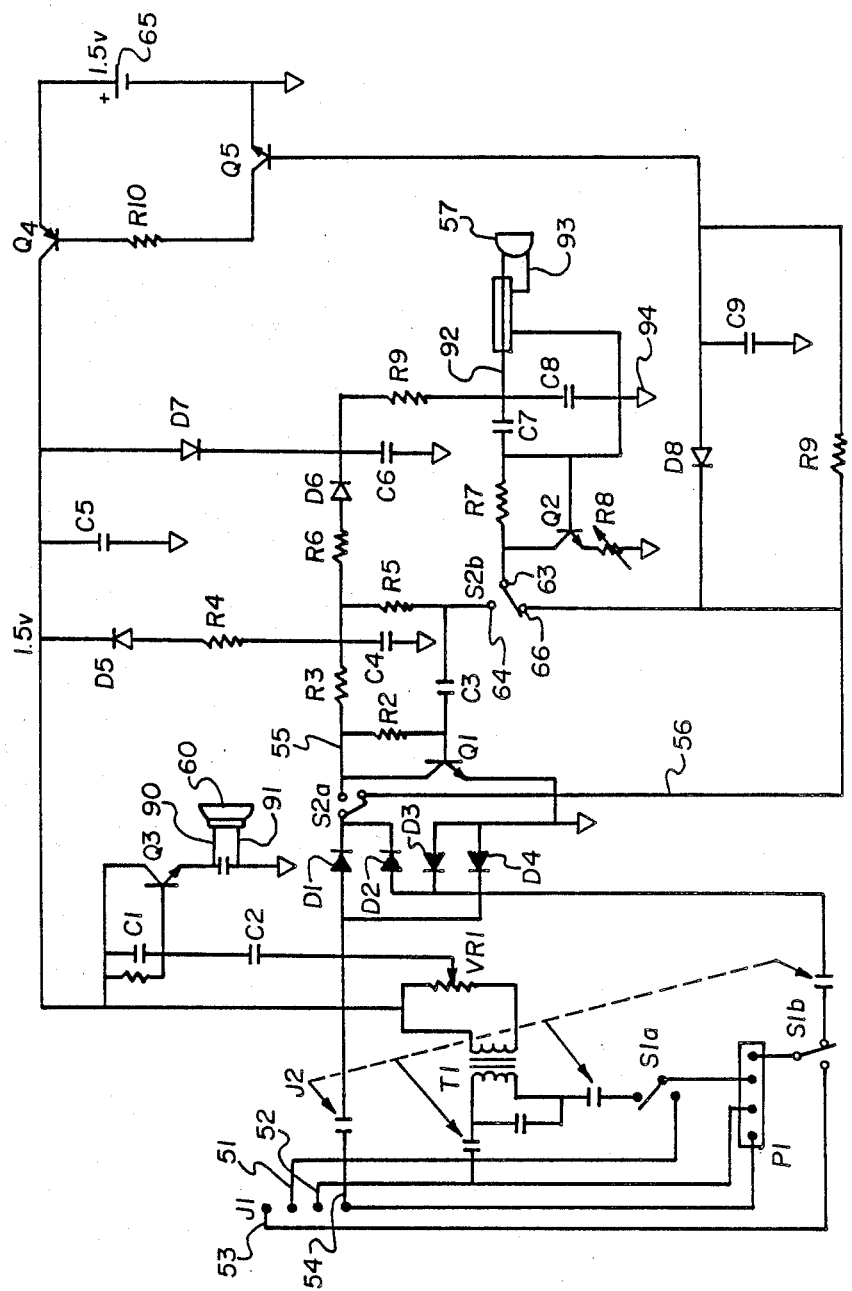
FIG. 4 is a schematic diagram of a basic control circuitry useful with the present invention.

FIG. 4 illustrates a sample circuit for implementing the block diagram previously discussed.

Turning now to FIG. 4, the one embodiment of circuitry is provided to illustrated inventive features of this disclosure. Signal is transferred to and from the telephone at junction J1, which corresponds to the mode switch 33 of FIG. 3. If the mode switch is set for handset use, the mode switch merely provides a direct shunt into the handset wiring 35. Therefore, no alternate wiring is shown in this schematic of FIG. 4 for this hand set operation. When switched to the hands-free operation represented by the present invention, signals are carried over lines designated as originating at J1.

As shown in FIG. 3, the signals next encounter the interconnect jack 32 which configures wiring connections to properly connect the two speaker wires with amplification circuitry and the two microphone wires with the microphone control circuitry. This interconnect configuring system is identified as J2 and is represented by gaps in the wiring in FIG. 4, located by the shadowed line array of arrows. Obviously, the specific nature of cross wiring needed at the interconnect jack 32 would depend upon the telephone wiring to which the invention is being attached. The present inventor has discovered a method utilizing only four plugs to effectively adapt any telephone, regardless of its wiring arrangement. As presently illustrated, contacts at J1 are identified as speaker contacts 51 and 52 and mike contacts 53 and 54. The mike signal is polarity controlled by the diode bridge D1, D2, D3 and D4. D1 and D2 require the signal to be positive, and pass the signal through switch S2 to either an electret circuit 56 or carbon mike circuit 55. This switch is closed at 45 when the telephone hand set microphone is a carbon mike. If the handset microphone is an electret mike, the signal is sent down via the second line 46 which functions to make the electret mike appear within the control circuitry 38 as a carbon mike. As a result, the electret mike utilized in the present invention produces a signal which is converted to appear as a carbon mike, regardless of whether the telephone mike is carbon or electret. This system is also utilized to activate the power supply 47 to operate the electret mike logic control circuitry 45.

Referring to FIG. 4, with the selector switch S2a and S2b set to a carbon mike configuration, the positive signal through the diode bank appears at the collector of Q1, and concurrently at the top of R2 and left of R3. Q1 functions to simulate the appearance of a carbon mike to the host telephone. Therefore, signal coming from the electret mike 57 is converted so that at the collector of Q1, it gives the appearance of being generated by a carbon mike, consistent with the carbon mike wiring of the host telephone. This signal includes a resistance whose average value is adjusted to give the appearance of the carbon mike (R2). It represents the impedance that the telephone would expect to see from a carbon mike system. Q1 and R2 are modulated by signal passed through C3. The DC signal seen at R3 decouples audio component and filters the signal through C4. The DC signal is routed through R4 and D5 and is directed left when opposite direction of current is blocked by transistor Q4. This signal powers the amplifier circuit and Q3 to drive the speaker 60. The sound signal from the telephone fed from lines 51 and 52 is isolated by transformer T1 and routed to the amplifier circuit through Q3 for driving the speaker 60. Volume control is provided by a variable resistor VR1.

Returning to the positive signal at line 55 following the diode bridge, a portion of signal passes through R6, D6 and through R9 to provide power to the electret mike 57. This power is in the form a high impedance, low current signal which is modulated by operation of the electret mike to provide audio control. The audio signal from the microphone is decoupled through capacitor C7, passes through resistor R7 and into the collector of Q2 with its variable resistor R8. When switch S2 is closed between points 63 and 64 the collector at Q2 is biased with a positive signal. This is the position when switch S2 is selected for the carbon mike configuration. The audio out from the electret microphone 57 is through C3 over to the base of Q1. As indicated previously, Q1 with its associated resistor R2 convert the electret microphone signal to the appearance of a carbon microphone signal.

Turning now to operation when switch 2a and 2b is positioned for use with telephone of electret mike configuration, this is the position shown in FIG. 4 with switch contacts as drawn between 63 and 66. In this configuration, the positive signal through D1 passes along line 56 through resistor R9 and weaves its way up to the base of Q5. Q5 is one of two transistors which physically turn on the battery 65 to drive the speaker 60. This power supply is needed because of the insufficient power provided by the low current from the electret microphone circuit. Filter C9 is provided to keep hum off of the transistor Q5 because Q5 is not otherwise biased or controlled. Positive signal from line 56 is also diverted up to pin 66 where the S2 switch has been closed for electret mike usage. This positive signal powers the transistor Q2, which includes a variable resistor for adjusting volume control unique to particular phone requirements. Power output from the battery is switched on and off by Q5 and controlled by Q4, passing the direct current to D7 which also operates to provide power to the electret microphone 57 through R9. D6 blocks current flow from this power source for passing to R6. D5 also functions to block current flow for passing through the circuit coupled to R4. This power is then supplied to Q3 with appropriate filtering to drive the speaker 60.

It will be apparent to those skilled in the art that other modifications and circuitry may be applied to incorporate the functions embodied in the preferred circuitry disclosed. It is therefore to be understood that the disclosed circuitry is only exemplary of the inventive concepts and should not be construed to be limiting, except as set forth in claims that follow.

Figure 5:
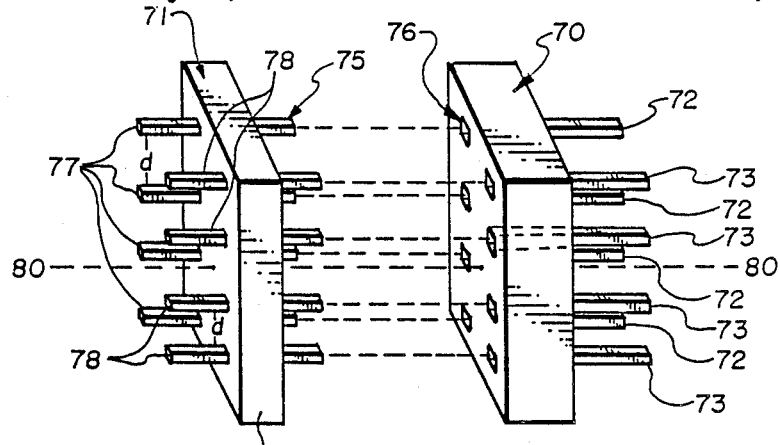
FIG. 5 shows an interconnect plug useful for adapting the attachable control circuitry to a telephone, despite variations in wiring of the microphone and speaker outlets.

Returning to the interconnect system between the circuitry and host telephone, FIG. 3 shows the use of interconnect jack 32 for adapting various wiring configurations for the respective pairs of speaker and microphone leads. One embodiment of such an interconnect jack is shown in FIG. 5 and includes a socket side 70 and a plug side 71. The socket side 70 is shown in an installed configuration at item 25 in FIG. 2. This socket 70 has two sets 72 and 73 of four electrical contacts or pins. As applied to the telephone leads connected with the microphone and speaker devices of a handset, two of the four electrical contacts of 72 and two of the contacts of 73 are designated as microphone contacts, with the remaining two contacts being speaker contacts. This is because the wiring arrangement of a telephone handset typically includes two leads for the microphone and two leads for the speaker element. Accordingly, these designated contacts would include means for coupling to the respective telephone microphone and speaker leads. One set of four electrical contacts 72 may be coupled to the telephone leads, with the remaining set 73 being coupled to the speaker and microphone leads of the control circuitry. In this configuration, the socket represents an open circuit wherein the four electrical leads from the telephone join the four leads from the control circuitry for the hands-free device.

These respective telephone 72 and control circuit 73 contacts are interconnected by means of one of four separate plugs 72 which are configured for individual insertion into the socket means as is illustrated by the hyphenated lines extending from pins 75 of plug 71 to receptacles 76 of socket 70. As with the socket 70, the plugs each have a first set of four electrical plug contacts 77 which are placed in electrical contact with the first set of four contacts 72 of the socket means when inserted. A second set of four electrical plug contacts 78 are provided and configured to mate with the second set of four contacts 73 of the socket. In actual use, therefore, the plug 71 is adapted to mate and seat securely by means of the proximate pins 75 being inserted into the receptacle 76 which are in electrical contact with identified contacts 72 and 73.

The opposing pin sides to the left of the plug body 79 represent wiring sites for control shunts or other circuitry utilized to interconnect the telephone system represented by contact 72 with the control circuitry represented by contact 73. This means for electrically connecting the individual plug contacts 77 and 78 to close these separate circuits enable adaption of the subject hands-free device to automatically conform to wiring differences which exist between the speaker and microphone wires in various different styles of telephone. Obviously, if there were a single standard which all telephones utilized in wiring the speaker and microphone elements of a handset, only one plug would be required, and in fact could be eliminated by hard wiring the hands-free device to the particular wiring standard. Unfortunately, such standards do not exist. Accordingly, the present invention includes a set of four plugs 71 which provide variable combinations of wiring connections to tie the telephone side 72 to the control circuitry 73 in an appropriate format.

In the preferred embodiment of the present invention, the contacts of the respective socket 70 and plug 71 are arranged in two symmetrical arrays 72/73 and 77/78 which permit rotation of the plug by 180 degrees about an insertion axis 80. This enables the plug element 71 to be inserted as shown in FIG. 5, or to be rotated 180 degrees (or inverted) so that the pins 77 are placed in the location that pins 78 held with respect to the socket 70.

In the FIG. 5 embodiment, the respective arrays of contacts are formed as two parallel, linear arrays of four contacts having equal separation distances D between contacts of this same array. These contacts are also represented in FIGS. 6, 7, 8 and 9 as pin locations and have been assigned labels of I$a$, I$b$, I$c$ and I$d$. The remaining four contacts have been identified as II$a$, II$b$, II$c$ and II$d$. It has been discovered by the inventor that when applied to two pairs of leads representing microphone and speaker devices, all possible configurations of telephone leads can be interconnected with the four predetermined and preassigned telephone and speaker leads of the control circuitry by utilizing only four individual plugs 71.

Figure 6:
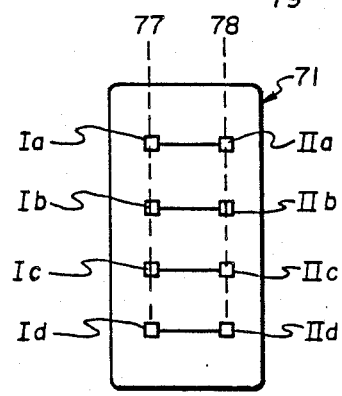
FIGS. 6, 7, 8 and 9 show various cross wiring configurations for the interconnect plug illustrated in FIG. 5 which enable universal adaption with all telephone devices.
Figure 7:
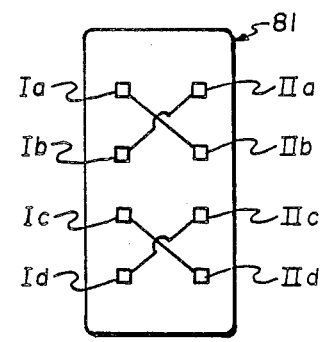

The FIG. 6 embodiment shows one of the four plugs wherein the respective contacts of the first array 77 are connected directly to corresponding contacts of array 78. In other words, I$a$ is connected or wired 80 to II$a$, I$b$ is wired to II$b$, etc. In fact, this is the primary configuration in most telephones in the marketplace. FIG. 7 shows an alternate cross over wiring configuration in which I$a$ is wired to II$b$, I$b$ being wired to II$a$. A similar cross over pattern is provided for I$c$ being wired to II$d$ and I$d$ being wired to II$c$. It should be noted that the inversion of configurations represented by FIG. 6 and FIG. 7 are identical. This means that if the wiring is 180 degrees in reverse on the telephone leads, the inversion is automatically accomplished regardless of which orientation the plug 71 or 81 is applied.

Figure 8:
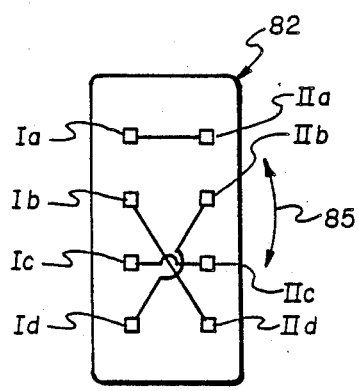
Figure 9:
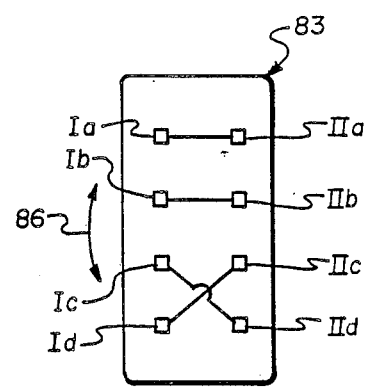

In FIGS. 8 and 9, however, inversion of these plugs results in a different wiring configuration. In FIG. 8, contact I$a$ is coupled to II$a$, I$b$ is coupled to II$d$, I$c$ is coupled to II$c$, and I$d$ is coupled to II$b$. When this plug is rotated 85 the direct I$a$ to II$a$ connection shifts to the base and the cross patterns of I$b$ and I$d$ shift to the top. Similarly for FIG. 9, I$a$ and I$b$ are respectively coupled to II$a$ and II$b$, with the second two contacts I$c$ and I$d$ being criss-crossed to II$d$ and II$c$ respectively. Rotation 86 of this plug also results in a different embodiment of connections.

It has been determined by the inventor that these four illustrated plugs FIGS. 6 through 9 represent all possible combinations of the microphone and speaker leads of a telephone, in view of the invariability of FIGS. 8 and 9 as illustrated. This is in direct contrast to prior art practice wherein many plugs were required to separately identify correct wiring configurations for the variety of telephone types in use. This discovery enables the subject hands-free invention to be marketed directly regardless of the phone style to which it may be applied. The system merely includes four plugs as shown in FIGS. 6 through 9. The system is installed with the plug of FIG. 6 because it represents the dominant pattern of wiring in the industry. If this plug does not work, the user is instructed to insert the embodiment of FIG. 7. If that plug does not properly wire the device, the plugs of FIGS. 8 and 9 are to be inserted and then rotated to represent four different plug configurations. One of these six configurations of wiring will enable the circuitry of the present invention.

A major obstacle in developing a workable hands-free system for telephone usage is the historic problem of feedback within the telephone system. This arises primarily because of the close proximity of the speaker and microphone within a single earpiece as shown at 49 in FIG. 3. Such problems can be aggravated because of the extended cord 48 which couples the earpiece 49 with the control circuitry 38. There may be inductive coupling between the respective lines which transmit signals through and from the earpiece 49.

The inventor has discovered that by manufacturing the subject device such that the microphone and speaker signals are out of phase, one can substantially eliminate these feedback problems. Referring to FIG. 4, the system is wired such that when wires 90 and 91 operate to push the speaker element 60, the microphone element 57 and its wiring 92 are such that the drive element is being pulled. The actual implementation of this procedure is practiced by testing the phase relationship of signals over wires 92 as opposed to signals over wires 90/91. The desired result is to insure that wires 90 and 91 are coupled to the speaker such that the speaker signal is approximately 180 degrees out of phase with the microphone signal transmitted over wire 92. With this opposing phase relationship, signals running up the wire 48 do not reinforce each other and thereby add to feedback problems. More importantly, the close proximity of the speaker 60 and microphone 57 within a single earpiece 49 does not result in feedback because the signals passing to the respective speaker and microphone are 180 degrees out of phase and therefore tend to cancel each other.

This opposed phasing relationship can be empirically accomplished by determining pre-set parameters for the physical relationships between the speaker, microphone and connecting wiring. Wire connections can then be adjusted to maximize proper out-of-phase relationship.

The proper phasing of microphone versus speaker can be accomplished utilizing a three wire connect system wherein one wire is the hot lead for the microphone, the second wire is the hot lead for the speaker and the third wire is the common ground to both. It can also be accomplished with a four wire connect system wherein the speaker and the microphone have their respective separate ground wires. With a three wire embodiment, the method for properly phasing the speaker and microphone in opposing polarity can be accomplished by realizing that the microphone wire is limited to the hot line for supplying power as is needed by an electret mike. Therefore, there is little choice in how to wire mike 57 because the line must be a power line. Therefore, wire 93 is the ground wire which passes to ground location 94. This ground status is common to one of the wires which will be connected to the speaker 60. The other wire will be the hot line which drives movement of the speaker element. Therefore, there are two choices in attaching these lines to the speaker. These two choices represent phase relationships which are approximately 180 degrees out of phase.

The desired method of the present invention can be practiced by connecting the two wires 90 and 91 to the speaker element 60 and determining if the phased relationship is out of phase by merely testing for feedback between the microphone 57 and speaker 60 during use. If feedback occurs, the wiring 90 and 91 can be reversed to establish opposing polarity and the required 180 degree out-of-phase relationship.

An important consideration which enhances the effectiveness of the present method of resolving feedback arises because of the presence of side tone in telephone systems. As previously mentioned, current telephone technology utilizes a signal from the microphone of the user which passes through telephone circuitry and to the earpiece of the user, permitting the person to actually hear his own conversation superimposed upon the conversation from the remote user. This side tone carries a fixed electrical phasing relationship which can be utilized to cancel potential feedback signal when the microphone and speaker are in close proximity as shown within a single earpiece 49. The phase relationship of this side tone is fixed because it is a hard wired element and does not arise because of acoustics. To the contrary, the phase relationship is fixed by the telephone manufacturer in implementing the side tone. The present method of eliminating feedback involves the step of wiring the speaker contacts so that the phase relationship existing at the speaker tends to cancel the phase relationship set by the telephone manufacturer, rather than to reinforce this side tone signal. Therefore, the present invention utilizes the existing side tone as a power source for canceling the occurrence of feedback. By phasing the speaker 180 degrees opposite to the phasing of the side tone, the present invention utilizes the power of the side tone to nullify ambient feedback, as opposed to reinforcing it.

It is the presence of such a side tone signal in other microphone/speaker combinations that permits the present invention to operate there as well. For example, in a communication system in aeronautics, a side tone signal is placed within the head set so that the pilot speaking into the microphone can also hear his voice and have the security of knowing that his signal is being received by the base transmitter receiver. Therefore, the present invention can be applied to a similar head set by wiring the speaker element in the ear such that it is 180 degrees out of phase with the side tone. In this configuration, the microphone can now be placed at the ear within less than 1.5 centimeters of the speaker without concern for feedback. This startling and unusual discovery that phase relationships can enable what has for years been impossible is both unexpected and surprising.

In fact, a dominant factor in causing adverse feedback which prevented the contiguous placement of speaker and microphone in head sets has been the occurrence of side tone. Past practice has been such that the side tone and speaker were in phase and therefore the side tone itself aggravated the feedback signal. The present invention adopts a simple technique of using the side tone signal to cancel feedback signal which it was previously deemed to have caused. This is accomplished by inverting the phase relationship of the speaker element by adjustment of wiring as opposed to modification of the side tone signal phase.

In view of the foregoing discussion of side tone, it is to be understood that references to telephone in this disclosure are to be comprehensive with respect to all forms of communication media which involve the use of speaker and microphone devices, and preferably those which include the occurrence of side tone. Therefore, radio transmission/receiver devices which include speaker and microphone elements are encompassed within the general reference to "telephone". This is particularly true where the radio or other communication device involves the use of side tone, which the present invention now utilizes as a control source to reduce occurrence of feedback.

These inventive concepts can virtually be applied to any speaker/microphone combination wherein the speaker includes positive and negative input leads for driving the speaker element and microphone which includes a power lead and is positioned within 1.5 centimeters of the speaker element such that the inductive influence between the opposing microphone and speaker signals is coupled to cancel reinforcement of feedback signal. Where the device includes side tone, the speaker wires are connected to be out of phase with the side tone signal. Therefore, as signal enters the speaker element wiring at phase 0 degrees, amplified signal arising from acoustical detection through the microphone enters at 180 degrees off set phase relationship. The effect is virtual cancellation of any ambient signal which tends to drive the amplified signal into squeal or inoperable condition.

Realization of interaction between the phase signals of the side tone and side tone/microphone and the speaker signal are best realized at close physical proximities. As is shown in FIG. 6, the speaker element 60 is within 1.5 centimeters of the microphone element 57. Here again, a variety of actual physical arrangements are possible.

It will be apparent to those skilled in the art that the foregoing description is for illustration purposes and is not to be construed as limiting as to the scope of the invention.

I claim:

1. A telephone speaker/microphone device for positioning at a user's ear and for coupling to microphone and speaker leads of a telephone or other communication device to enable hands-free communication in duplex mode without use of a handset, said device comprising:

control circuitry including telephone coupling leads for attachment to the telephone microphone and speaker leads for receiving incoming voice signals from the telephone and for transmitting outgoing voice signals from speaker microphone device to the telephone, said circuitry including secondary leads for transmittance of the respective voice signals to and from a speaker/microphone combination for positioning at the ear and separate from the telephone handset;

a speaker element including positive and negative input leads for driving the speaker element and being configured in size and shape for positioning at the ear, said speaker element being part of the speaker/microphone combination;

a microphone element having an attached drive line capable of carrying voice signal and being configured in size and shape for positioning at the ear and proximate to the speaker element, said speaker element being part of the speaker/microphone combination;

said speaker element and microphone element being wired such that voice signal carried on the drive line of the microphone element is approximately 180 degrees out of phase with voice signal delivered to the speaker element and being physically positioned sufficiently close to result in cancellation of feedback; and means for transmitting voice signal between the speaker/microphone combination and the control circuitry to electronically couple the speaker and microphone elements to the corresponding secondary leads of the control circuitry.

2. A telephone device including a speaker/microphone device for suspending at a user's ear and for coupling to microphone and speaker leads of a telephone to enable hands-free communication in duplex mode without use of a handset, including use of a side tone representing voice signal provided from the user for retransmission to the user, said telephone device including:

control circuitry including telephone coupling leads for attachment to the telephone microphone and speaker leads for receiving incoming voice signals from the telephone and for transmitting outgoing voice signals from the speaker/microphone device to the telephone, said circuitry including secondary leads for transmittance of the respective voice signals to and from the speaker/microphone device for positioning at the ear and separate from the telephone handset;

a speaker element including positive and negative input leads for driving the speaker element and being configured in size and shape for positioning at the ear, said speaker element being part of the speaker/microphone device;

a microphone element having an attached drive line capable of carrying voice signal and being configured in size and shape for positioning at the ear and proximate to the speaker element, said speaker element being part of the speaker/microphone device;

said speaker element and microphone element being wired such that voice signal carried on the drive line of the microphone element is approximately 180 degrees out of phase with voice signal delivered to the speaker element and being physically positioned sufficiently close to result in cancellation of feedback; and means for transmitting voice signal and side tone between the speaker/microphone device and the control circuitry to electronically couple the speaker and microphone elements to the corresponding secondary leads of the control circuitry.

3. A device as defined in claim 2, wherein the positive and negative input leads of the speaker element are connected such that the side tone transmitted to the speaker element is approximately 180 degrees out of phase with other voice signal received at the speaker element.

4. A device as defined in claim 1 or claim 2, wherein the speaker/microphone device is wired in series with the telephone handset and further includes switching means for selecting handset operation wherein voice signals are transmitted through the handset or for selecting alternate operation wherein the voice signals are transmitted to the speaker/microphone device.

5. A device as defined in claim 1 or claim 2, further comprising (i) means for detecting whether the telephone handset utilizes a carbon microphone or an electret microphone and (ii) means for electronically adapting the speaker/microphone device with the single microphone element for use with either a carbon microphone or electret microphone.

6. A device as defined in claim 1 or claim 2, further comprising (i) means for detecting whether the telephone handset utilizes a carbon microphone or an electret microphone and (ii) means for electronically adapting the speaker/microphone device with the single microphone element for use with either a carbon microphone or electret microphone, and wherein the single microphone element comprises an electret microphone and the means for adapting the device comprises electronic circuitry which converts output of the electret microphone to simulate output of a carbon microphone.

7. A device as defined in claim 1 or claim 2, further comprising a single interconnect plug and receptacle wired in series with the telephone leads wherein the telephone leads consist of one pair of microphone leads and one pair of speaker leads, said receptacle having eight contacts.

8. A telephone speaker/microphone device as defined in claim 1, further comprising an interconnect jack for positioning in line between the leads of the telephone and the control circuitry, said jack including:

socket means having two sets of four electrical contacts, two of each of the four electrical contacts being designated as speaker contacts and two being designated as microphone contacts, a first set of the two sets of socket contacts including means for coupling to telephone microphone and speaker leads, a second set of the two sets of socket contacts including means for coupling to the secondary leads of the control circuitry for transmittance of the voice signals within the control circuitry;

four separate plugs configured for individual insertion into the socket means, each plug having a first set of four electrical plug contacts which come into electrical contact with the first set of four contacts of the socket means when inserted therein, a second set of four electrical plug contacts which come into electrical contact with the second set of four contacts of the socket means when inserted therein;

means for electrically connecting individual plug contacts of the respective first set of plug contacts of the four separate plugs with the respective second set of plug contacts of each of the four plugs such that all combinations of connections of speaker-to-speaker and microphone-to-microphone contacts existing within the socket means are provided within the four plugs.

9. A device as defined in claim 8, wherein the contacts of the respective socket means and four plugs are arranged in two symmetrical arrays which permit rotation of at least two plugs by 180 degrees about an insertion axis such that the plugs may have two insertion positions offset by 180 degrees displacement for connecting the respective two sets of four contacts of the socket means.

10. A device as defined in claim 9, wherein the two symmetrical arrays comprise two parallel, linear arrays of four contacts having equal separation distances between contacts of the same array, the first set of four plug contacts of one plug being identified in serial order as contacts I$a$, I$b$, I$c$ and I$d$, the second set of plug contacts of each of the four plugs being identified as II$a$, II$b$, II$c$ and II$d$ and wherein the connections of individual plug contacts bridge between I$a$ and II$a$, I$b$ and II$b$, I$c$ and II$c$ and I$d$ and II$d$.

11. A device as defined in claim 9, wherein the two symmetrical arrays comprise two parallel, linear arrays of four contacts having equal separation distances between contacts of the same array, the first set of four plug contacts of each plug being identified in serial order as contacts I$a$, I$b$, I$c$ and I$d$, the second set of plug contacts of each of the four plugs being identified as II$a$, II$b$, II$c$ and II$d$ and wherein the connections of individual plug contacts bridge between I$a$ and II$b$, I$b$ and II$a$, I$c$ and II$d$, and I$d$ and II$c$.

12. A device as defined in claim 9, wherein the two symmetrical arrays comprise two parallel, linear arrays of four contacts having equal separation distances between contacts of the same array, the first set of four plug contacts of each plug being identified in serial order as contacts I$a$, I$b$, I$c$ and I$d$, the second set of plug contacts of each of the four plugs being identified as II$a$, II$b$, II$c$ and II$d$ and wherein the connections of individual plug contacts bridge between I$a$ and II$a$, I$b$ and II$d$, I$c$ and II$c$ and I$d$ and II$b$, the plug having two insertion positions which enable the plug to be rotated 180 degrees about its insertion axis.

13. A device as defined in claim 9, wherein the two symmetrical arrays comprise two parallel, linear arrays of four contacts having equal separation distances between contacts of the same array, the first set of four plug contacts of each plug being identified in serial order as contacts I$a$, I$b$, I$c$ and I$d$, the second set of plug contacts of each of the four plugs being identified as II$a$, II$b$, II$c$ and II$d$ and wherein the connections of individual plug contacts bridge between I$a$ and II$a$, I$b$ and II$b$, I$c$ and II$d$ and I$d$ and II$c$, the plug having two insertion positions which enable the plug to be rotated 180 degrees about its insertion axis.

14. An interconnect jack for positioning in-line between four microphone and speaker leads of a telephone and corresponding leads of control circuitry for controlling disposition of signal received through the leads, said jack including:

socket means having two sets of four electrical contacts, two of each of the four electrical contacts being designated as speaker contacts and two being designated as microphone contacts, a first set of the two sets of socket contacts including means for coupling to the telephone microphone and speaker leads, a second set of the two sets of socket contacts including means for coupling to the leads of the control circuitry for transmittance of the voice signals within the control circuitry;

four separate plugs configured for individual insertion into the socket means, each plug having a first set of four electrical plug contacts which come into electrical contact with the first set of four contacts of the socket means when inserted therein, a second set of four electrical plug contacts which come into electrical contact with the second set of four contacts of the socket means when inserted therein;

means for electrically connecting individual plug contacts of the respective first set of plug contacts of the four separate plugs with the respective second set of plug contacts of each of the four plugs such that all combinations of connections of speaker-to-speaker and microphone-to-microphone contacts existing within the socket means are provided within the four plugs.

15. A device as defined in claim 14, wherein the contacts of the respective socket means and four plugs are arranged in two symmetrical arrays which permit rotation of at least two plugs by 180 degrees about an insertion axis such that the plugs may have two insertion positions offset by 180 degrees displacement for connecting the respective two sets of four contacts of the socket means.

16. A device as defined in claim 15, wherein the two symmetrical arrays comprise two parallel, linear arrays of four contacts having equal separation distances between contacts of the same array, the first set of four plug contacts of one plug being identified in serial order as contacts I$a$, I$b$, I$c$ and I$d$, the second set of plug contacts of each of the four plugs being identified as II$a$, II$b$, II$c$ and II$d$ and wherein the connections of individual plug contacts bridge between I$a$ and II$a$, I$b$ and II$b$, I$c$ and II$c$ and I$d$ and II$d$.

17. A device as defined in claim 15, wherein the two symmetrical arrays comprise two parallel, linear arrays of four contacts having equal separation distances between contacts of the same array, the first set of four plug contacts of each plug being identified in serial order as contacts I$a$, I$b$, I$c$ and I$d$, the second set of plug contacts of each of the four plugs being identified as II$a$, II$b$, II$c$ and II$d$ and wherein the connections of individual plug contacts bridge between I$a$ and II$b$, I$b$ and II$a$, I$c$ and II$d$, and I$d$ and II$c$.

18. A device as defined in claim 15, wherein the two symmetrical arrays comprise two parallel, linear arrays of four contacts having equal separation distances between contacts of the same array, the first set of four plug contacts of each plug being identified in serial order as contacts I$a$, I$b$, I$c$ and I$d$, the second set of plug contacts of each of the four plugs being identified as II$a$, II$b$, II$c$ and II$d$ and wherein the connections of individual plug contacts bridge between I$a$ and II$a$, I$b$ and II$d$, I$c$ and II$c$ and I$d$ II$b$, the plug having two insertion positions which enable the plug to be rotated 180 degrees about its insertion axis.

19. A device as defined in claim 15, wherein the two symmetrical arrays comprise two parallel, linear arrays of four contacts having equal separation distances between contacts of the same array, the first set of four plug contacts of each plug being identified in serial order as contacts I$a$, I$b$, I$c$ and I$d$, the second set of plug contacts of each of the four plugs being identified as II$a$, II$b$, II$c$ and II$d$ and wherein the connections of individual plug contacts bridge between I$a$ and II$a$, I$b$ and II$b$, I$c$ and II$d$ and I$d$ and II$c$, the plug having two insertion positions which enable the plug to be rotated 180 degrees about its insertion axis.

* * * * *